(12) United States Patent
Kim et al.

(10) Patent No.: US 9,435,063 B2
(45) Date of Patent: Sep. 6, 2016

(54) WASHING MACHINE AND CONTROL METHOD THEREOF

(75) Inventors: Hyun Sook Kim, Hwaseong-si (KR); Jung Ran Jung, Suwon-si (KR); Sung Jin Kim, Seongnam-si (KR); Sang Yeon Pyo, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 1140 days.

(21) Appl. No.: 13/336,562

(22) Filed: Dec. 23, 2011

(65) Prior Publication Data

US 2012/0167314 A1    Jul. 5, 2012

(30) Foreign Application Priority Data

Jan. 4, 2011   (KR) .................. 10-2011-0000667

(51) Int. Cl.
| | | |
|---|---|---|
| D06F 33/02 | (2006.01) | |
| D06F 39/04 | (2006.01) | |
| D06F 39/08 | (2006.01) | |

(52) U.S. Cl.
CPC ............ *D06F 33/02* (2013.01); *D06F 39/045* (2013.01); *D06F 39/088* (2013.01); *D06F 2202/02* (2013.01); *D06F 2202/04* (2013.01); *D06F 2204/04* (2013.01); *D06F 2214/00* (2013.01); *Y02B 40/56* (2013.01)

(58) Field of Classification Search
CPC .... D06F 33/02; D06F 39/045; D06F 39/088; D06F 2202/02; D06F 2202/04; D06F 2204/04; D06F 2214/00; Y02B 40/56

USPC ..................................................... 8/158–159
See application file for complete search history.

(56) References Cited

U.S. PATENT DOCUMENTS

| | | | | |
|---|---|---|---|---|
| 2007/0289607 | A1* | 12/2007 | Kim et al. ...................... | 134/18 |
| 2008/0115294 | A1* | 5/2008 | Schaub ................. | D06F 35/005 8/158 |

FOREIGN PATENT DOCUMENTS

| | | |
|---|---|---|
| CN | 101128629 | 2/2008 |
| CN | 101725012 | 6/2010 |
| DE | 100 17 160 | 4/2001 |
| DE | 10 2007 002 184 | 7/2008 |
| KR | 10-2007-0019564 | 2/2007 |
| KR | 10-2008-0084887 | 9/2008 |
| WO | WO 2005/064063 | 7/2005 |
| WO | WO 2006/091056 | 8/2006 |

OTHER PUBLICATIONS

Espacenet English Abstract of German Application No. DE10017160 published Apr. 5, 2001.
English Abstract of German Application No. DE102007002184.
English Abstract of WO 2005/064063, Published Jul. 14, 2005 (in publication).

(Continued)

*Primary Examiner* — Michael Barr
*Assistant Examiner* — Levon J Shahinian
(74) *Attorney, Agent, or Firm* — Staas & Halsey LLP

(57) ABSTRACT

A washing machine and control methods thereof to enhance washing quality, even when using eco-friendly natural soap-based detergent. Controlling a rinse water temperature based on a wash water temperature to reduce a temperature difference therebetween prevents gelation caused by natural soap-based detergent and maximizes washing quality when using this type of detergent.

15 Claims, 5 Drawing Sheets

(56) References Cited

OTHER PUBLICATIONS

European Search Report in Application No. 11194410.4 dated Dec. 9, 2013.
Abstract (Machine Translation), Unexamined Publication No. 10-2007-0019564, published Feb. 15, 2007.
Korean Patent Abstracts, Publication No. 10-2007-0038719, published Apr. 11, 2007.
Espacenet Abstract, Publication No. 101128629, published Feb. 20, 2008.
Espacenet Abstract, Publication No. 10-2008-0084887, published Sep. 22, 2008.
Korean Patent Abstracts, Publication No. 10-2009-0046080, published May 11, 2009.
Espacenet Abstract, Publication No. 101725012, published Jun. 9, 2010.
Korean Notice of Allowance mailed on Mar. 17, 2015 in Application No. 10-2011-0000667.
Chinese Office Action mailed on Mar. 30, 2015 in Application No. 201110460427.6.
European Patent Office Decision to Grant for related European Patent Application No. 11 194 410.4, issued Nov. 5, 2015, 28 pages.

\* cited by examiner

WASHING MACHINE AND CONTROL METHOD THEREOF

CROSS-REFERENCE TO RELATED APPLICATIONS

This application claims the benefit of Korean Patent Application No. 2011-0000667, filed on Jan. 4, 2011 in the Korean Intellectual Property Office, the disclosure of which is incorporated herein by reference.

BACKGROUND

1. Field

Embodiments of the present invention relate to a washing method of a washing machine using natural soap-based detergent.

2. Description of the Related Art

Generally, a washing machine (conventionally, a drum washing machine) includes a wash tub to receive fresh water (wash water or rinse water) therein, a cylindrical drum rotatably installed in the wash tub to receive laundry therein, and a motor to rotate the drum. When the drum is rotated, the laundry received in the drum is washed via tumbling motions along an inner wall of the drum.

The washing machine washes laundry via a series of operations including a washing operation to separate contaminants from laundry using detergent-dissolved water (i.e., wash water), a rinsing operation to remove bubbles or residual detergent from the laundry using water not containing detergent (i.e., rinse water), and a dehydrating or "spin" operation to dehydrate the laundry at a high speed.

In the washing operation, after detergent is put in the wash tub along with water (i.e., wash water), the drum is rotated clockwise or counterclockwise based on operation of the motor to generate streams of the detergent-dissolved water (i.e. a mixture of water and detergent) to penetrate the laundry, thereby enabling removal of contaminants from the laundry. Since only synthetic detergent has been used with conventional washing machines, a control algorithm, i.e., a washing and rinsing algorithm is set based on synthetic detergent.

However, as environmental pollution has intensified in recent years, eco-friendly materials are increasingly utilized as a washing machine detergent. In particular, use of soap-based detergent not containing synthetic materials is increasing. Such soap-based detergent contains natural materials and may be suitable to wash clothes of users who suffer from dermatitis (atopic dermatitis patients or senile pigmentosum) as well as infants and children.

These natural soap-based detergents, however, have difficulty being dissolved in cold water and may undergo gelation when the temperature of rinse water used for a rinsing operation is lower than the temperature of wash water used for a washing operation, thereby leaving behind residue on clothes to be washed, resulting in deterioration in washing quality.

SUMMARY

It is an aspect of the present invention to provide a washing machine and a control method thereof, which achieve enhanced washing quality despite use of natural soap-based detergent.

Additional aspects of the invention will be set forth in part in the description which follows and, in part, will be obvious from the description, or may be learned by practice of the invention.

In accordance with one aspect of the invention, a control method of a washing machine including a drum in which laundry is received and a motor to rotate the drum, includes judging whether or not a washing course using soap-based detergent is selected, detecting a temperature of wash water if the washing course using soap-based detergent is selected, and setting a temperature of rinse water such that a difference between the wash water temperature and the rinse water temperature is within a predetermined temperature difference or less, so as to perform a rinsing operation.

Setting the rinse water temperature may include setting the rinse water temperature stepwise based on the detected wash water temperature.

Setting the rinse water temperature stepwise may include setting the rinse water temperature so as to be lower than the wash water temperature by the predetermined temperature difference or less.

Setting the rinse water temperature stepwise may include setting the rinse water temperature so as to be gradually lowered based on the number of rinsing operations.

Setting the rinse water temperature so as to be gradually lowered may include setting a difference between the rinse water temperature and a subsequent rinse water temperature to within a predetermined temperature difference or less.

The predetermined temperature difference may be about 30° C.

The control method may further include detecting a turbidity of the rinse water, and comparing the detected rinse water turbidity with a reference turbidity such that a rinsing operation using cold water is performed regardless of the set rinse water temperature if the rinse water turbidity is the reference turbidity or less.

The control method may further include judging whether or not wash water is cold water, and assisting dissolution of the soap-based detergent via mechanical drive force obtained by operating the motor if the wash water is cold water.

The motor may be operated at a higher operation rate than a target operation rate that is set for a washing operation, so as to increase mechanical drive force of the drum.

In accordance with another aspect of the present invention, a washing machine includes a wash tub, a water supply device to supply wash water and rinse water into the wash tub, a temperature sensor to detect temperatures of the wash water and the rinse water, and a control unit to perform a rinsing operation by controlling the rinse water temperature based on the wash water temperature if a soap-based detergent washing course is selected.

The control unit may set the rinse water temperature stepwise based on the detected wash water temperature such that a difference between the wash water temperature and the rinse water temperature is within a predetermined temperature difference or less.

The control unit may gradually lower the rinse water temperature based on a number of rinsing operations.

The control unit may set the rinse water temperature stepwise based on the detected wash water temperature such that a difference between the rinse water temperature and a subsequent rinse water temperature is within a predetermined temperature difference or less.

The washing machine may further include a turbidity sensor to detect a turbidity of the rinse water, and the control unit may compare the detected rinse water turbidity with a reference turbidity such that a rinsing operation using cold water is performed regardless of the set rinse water temperature if the rinse water turbidity is the reference turbidity or less.

The washing machine may further include a drum installed in the wash tub to receive laundry therein, and a motor to rotate the drum, and the control unit may judge whether or not the wash water is cold water and may assist dissolution of the soap-based detergent via mechanical drive force obtained by operating the motor if the wash water is cold water.

The motor may be operated at a higher operation rate than a target operation rate that is set for a washing operation, so as to increase mechanical drive force of the drum.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
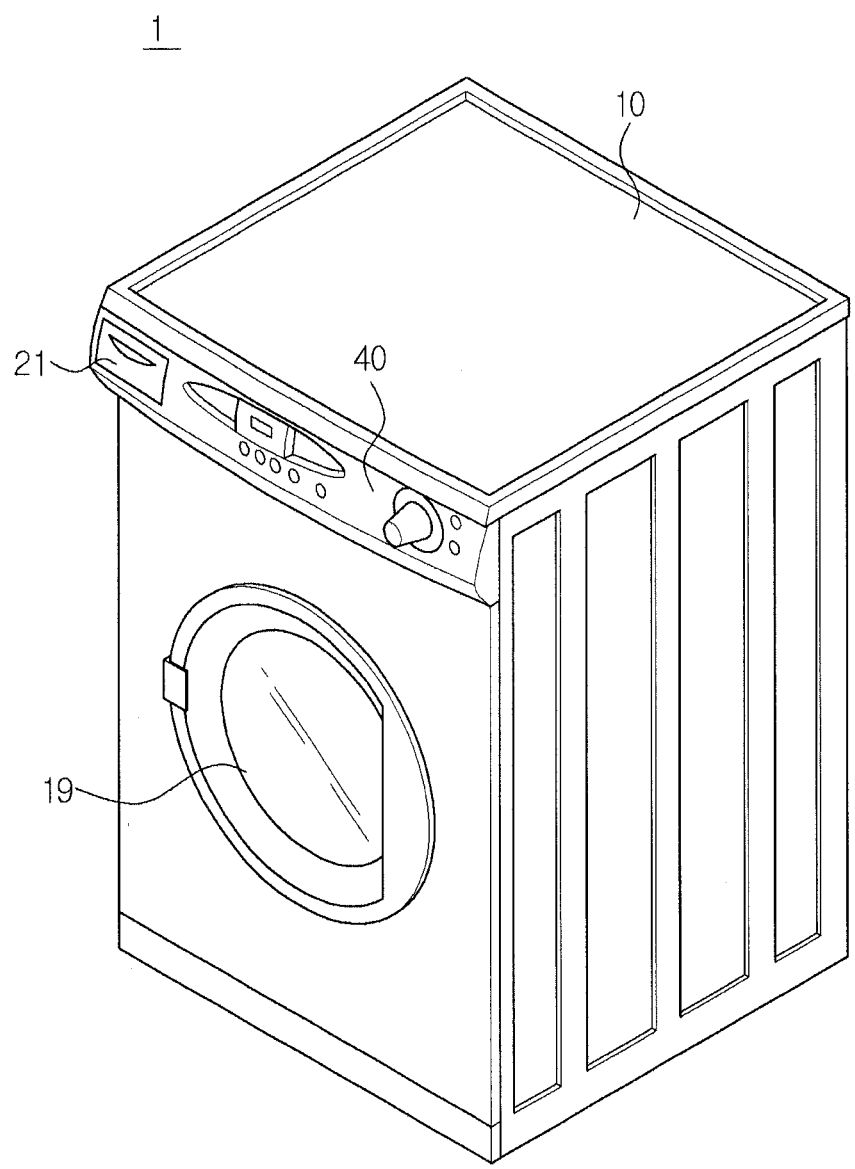
FIG. 1 is a perspective view illustrating an outer appearance of a washing machine according to an embodiment of the present invention.

Reference will now be made in detail to the present invention, examples of which are illustrated in the accompanying drawings, wherein like reference numerals refer to like elements throughout.

Figure 2:
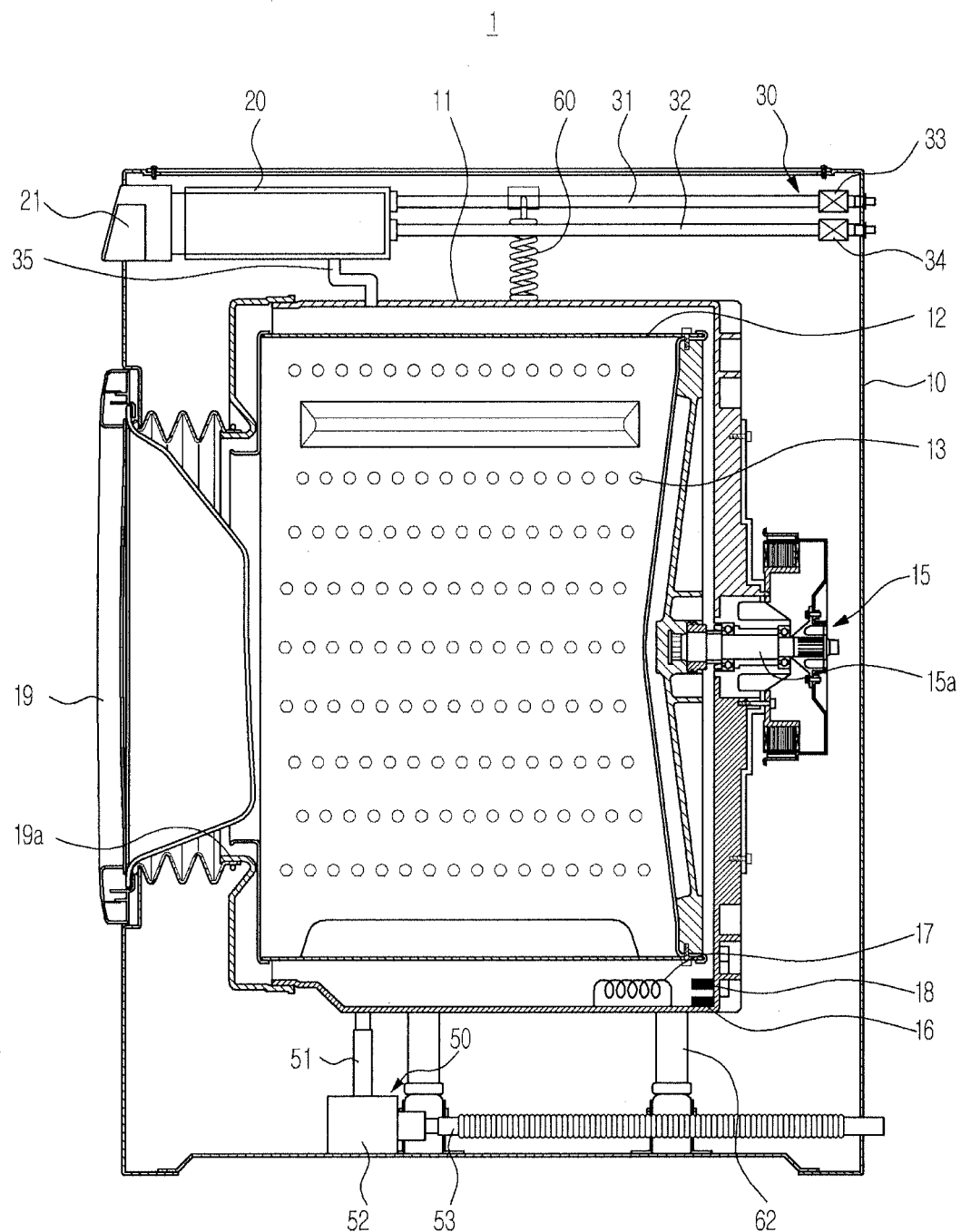
FIG. 2 is a sectional view illustrating a configuration of the washing machine shown in FIG. 1.

FIG. 1 is a perspective view illustrating an outer appearance of a washing machine according to an embodiment of the present invention, and FIG. 2 is a sectional view illustrating a configuration of the washing machine shown in FIG. 1.

Referring to FIGS. 1 and 2, the washing machine 1 according to this first embodiment of the present invention includes a box-shaped main body 10 defining an outer appearance of the washing machine 1, a drum-shaped wash tub 11 installed in the main body 10 to receive fresh water (wash water or rinse water) therein, and a cylindrical drum 12 rotatably installed in the wash tub 11 and having a plurality of holes 13.

A motor 15 is mounted to a rear outer surface of the wash tub 11. The motor 15 is a drive device to rotate a rotating shaft 15a connected to the drum 12 to enable implementation of a washing operation, a rinsing operation and a dehydrating operation. A variety of sensors are mounted in a lower region of the wash tub 11. These sensors may include a water-level sensor 16 to detect frequency change corresponding to water-level change so as to detect the level of water received in the wash tub 11, a heater 17 to heat the water received in the wash tub 11, and a temperature sensor 18 to detect the temperature of water (wash water or rinse water) received in the wash tub 11.

A door 19 is installed at a front surface of the main body 10. The door 19 has an opening 19a through which laundry is put into or taken out of the drum 12.

A detergent supply device 20 to supply detergent (e.g., synthetic detergent or natural soap-based detergent) and a water supply device 30 to supply water (wash water or rinse water) are installed above the wash tub 11.

The detergent supply device 20, the interior of which is divided into a plurality of spaces, is located toward the front surface of the main body 10 to allow a user to easily input detergent and softener into the respective spaces of the detergent supply device 20.

The water supply device 30 includes cold water and hot water supply pipes 31 and 32 connecting the detergent supply device 20 and an external water supply pipe to supply water (wash water or rinse water) into the wash tub 11, cold water and hot water valves 33 and 34 installed on the cold water and hot water supply pipes 31 and 32 to control supply of water, and a connecting pipe 35 to connect the detergent supply device 20 and the wash tub 11 to each other. With this configuration, the water is supplied into the wash tub 11 by way of the detergent supply device 20, thereby allowing the detergent received in the detergent supply device 20 to be supplied into the wash tub 11 along with water.

In addition, a control panel 40, which includes a variety of buttons and a display panel to control the washing machine 1, is provided at an upper region of the front surface of the main body 10. A detergent input opening 21 communicating with the interior of the detergent supply device 20 is formed in a side region of the control panel 40 to input detergent into the washing machine 1.

The washing machine 1 according to the embodiment of the present invention includes a drain device 50 to drain the water from the wash tub 11. The drain device 50 includes a first drain pipe 51 connected to the bottom of the wash tub 11 so as to drain the water out of the wash tub 11, a drain pump 52 installed on the first drain pipe 51, and a second drain pipe 53 connected to an exit of the drain pump 52.

In addition, the washing machine 1 according to this embodiment of the present invention includes a suspension spring 60 to elastically support the wash tub 11 from the upper side of the wash tub 11 and to prevent vibration generated during operation of the washing machine 1, and a damper 62 installed to the bottom of the wash tub 11 to alleviate vibration of the wash tub 11.

The suspension spring 60 and the damper 62 movably support the wash tub 11 respectively at the top and bottom of the wash tub 11. Specifically, the suspension spring 60 and the damper 62 alleviate all directional vibration of the wash tub 11 caused during rotation of the drum 12.

Figure 3:
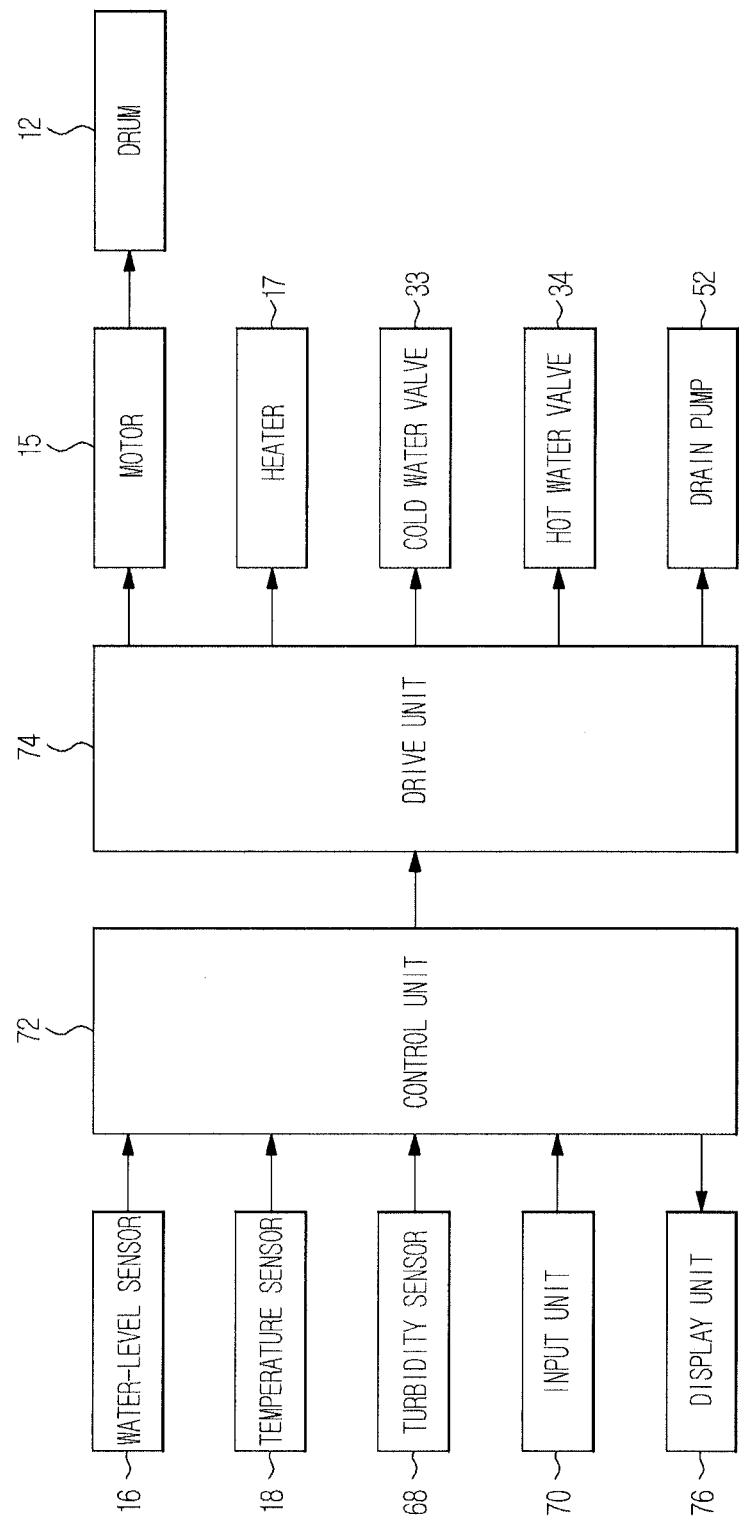
FIG. 3 is a control block diagram of the washing machine according to an embodiment of the present invention.

FIG. 3 is a control block diagram of the washing machine according to an embodiment of the present invention. There are provided a turbidity sensor 68, an input unit 70, a control unit 72, a drive unit 74, and a display unit 76.

The turbidity sensor 68 serves to detect turbidity of rinse water so as to detect the residual amount of detergent during the rinsing operation of the washing machine 1 and inputs the detected turbidity into the control unit 72.

The input unit 70 serves to allow the user to select washing, rinsing and dehydrating operations or to input other operational information, such as a selected washing course (e.g., a standard washing course or a soap-based detergent washing course), dehydration RPM, and the number of rinsing operations, into the control unit 72.

Here, the standard washing course utilizes a conventional washing control algorithm based on synthetic detergent.

On the other hand, the soap-based detergent washing course utilizes a washing control algorithm based on natural soap-based detergent. More particularly, the soap-based detergent washing course utilizes a rinsing algorithm to prevent gelation caused by natural soap-based detergent due to a temperature difference while assuring easy dissolution of the natural soap-based detergent.

The input unit 70 is provided at the control panel 40 and includes a plurality of buttons to input a user command related to operation of the washing machine 1 (e.g., soaking, washing, rinsing and dehydrating operation selecting buttons and detergent kind selecting buttons). The plurality of buttons further includes a button to select a soap-based detergent washing course based on the kind of detergent (more particularly, natural soap-based detergent) put into the washing machine 1.

The control unit 72 is a microcomputer to control general operations of the washing machine 1 (i.e. washing, rinsing and dehydrating operations) based on the operational information input from the input unit 70. The control unit 72 sets target washing and rinsing water-levels, motor RPM and operation rate (motor On-Off time), washing and rinsing times, and the like, based on load (e.g., laundry weight) in the selected washing course.

In the case of washing using natural soap-based detergent, the control unit 72 controls a rinse water temperature based on a wash water temperature so as to change the rinse water temperature on a per rinsing operation basis, which enables effective implementation of the rinsing operation. This serves to prevent gelation caused by a rapid drop in the rinse water temperature Tr relative to the wash water temperature Tw because gelation is most severe when only cold water is supplied during a rinsing operation performed immediately after a washing operation using water of 30° C. or more. That is, gelation worsens when a difference ($\Delta T = Tw - Tr$) between the wash water temperature Tw and the rinse water temperature Tr of the rinsing operation performed immediately after the washing operation is great (e.g., 30° C. or more).

Thus, to prevent gelation, it may be necessary to reduce the difference ($\Delta T = Tw - Tr$) between the wash water temperature Tw and the rinse water temperature Tr below a predetermined value (e.g., 30° C.) by changing the rinse water temperature Tr based on the wash water temperature Tw. To this end, upon implementation of a soapy washing operation, the control unit 72 sets the rinse water temperature Tr based on the wash water temperature Tw.

Hereinafter, methods of setting the rinse water temperature Tr based on the wash water temperature Tw by the control unit 72 will be described in more detail.

In a first method, if hot wash water of 50° C. or more is used, the rinse water temperature Tr for a first rinsing operation is set to 50° C. and then, is set to 30° C. for remaining rinsing operation(s).

In a second method, if tepid wash water of 30° C.~40° C. is used, the rinse water temperature Tr is set to 30° C. during all rinsing operations.

In a third method, if cold wash water is used, all rinsing operations are performed using cold water. In this case, it may be necessary to increase agitation mechanical drive force of the drum 12 to enhance rinsing performance.

In addition to the above described three methods, various other methods to set the rinse water temperature Tr based on the wash water temperature Tw may be utilized.

For example, in relation to the first method, instead of setting the rinse water temperature Tr to 30° C. for the remaining rinsing operation(s), rinsing operation(s) after a preset number of rinsing operations (e.g., three times) may be performed using cold water, in order to save energy required for supply of hot water and heating of rinse water.

Similarly, in relation to the second method, instead of setting the rinse water temperature Tr to 30° C. during all rinsing operations, rinsing operation(s) after a preset number of rinsing operations (e.g., two times) may be performed using cold water, in order to save energy required for supply of hot water and heating of rinse water.

The control unit 72 compares turbidity of rinse water detected by the turbidity sensor 68 with a preset reference turbidity. If the detected turbidity of rinse water is a reference turbidity or less, rinsing using cold water may be performed by the control unit 72 even if the rinse water temperature Tr is set to 30° C. This serves to save energy required for supply of hot water and heating of rinse water because the washing quality may be maintained despite the rinsing using cold water.

If a washing course using natural soap-based detergent is selected, an additional detergent dissolution stage may be added under control of the control unit 72 in consideration of the fact that natural soap-based detergent has difficulty being dissolved. This is more necessary when only cold wash water is supplied. In the detergent dissolution stage, after a lower quantity of wash water (more particularly, detergent-dissolved water) than the target washing water-level based on load (i.e. the weight of laundry) is supplied, agitation mechanical drive force of the drum 12 is increased for a predetermined time (i.e. an appropriate time for dissolution of the soap-based detergent) so as to facilitate dissolution of the soap-based detergent. To increase agitation mechanical drive force of the drum 12, the motor 15 may be operated with higher mechanical drive force (RPM and operation rate) than the preset target RPM and operation rate of the washing operation.

In addition to increasing agitation mechanical drive force of the drum 12, the control unit 72 may control dissolution of the soap-based detergent using an additional device (e.g., a bubble generating device or a circulating device).

Alternatively, the control unit 72 may directly perform a soapy washing operation without the detergent dissolution stage if only hot wash water is used or if the wash water temperature Tw is a predetermined value or more.

Alternatively, the control unit 72 may perform a soapy washing operation after completion of the detergent dissolution stage. In this case, the soapy washing operation is performed at a preset target RPM and operation rate (motor On-Off time) after wash water is supplied up to a preset water-level. An implementation algorithm of the soapy washing operation may be similar or equal to a control algorithm of the standard washing course based on synthetic detergent.

The drive unit 74 operates the motor 15, the heater 17, the cold water and hot water valves 33 and 34 and the drain pump 52 based on a drive control signal of the control unit 72.

The display unit 76 is provided at the control panel 40 and displays an operation mode of the washing machine 1 based on a display control signal of the control unit 72.

Hereinafter, the washing machine and the operational sequence and effects of a control method thereof according to the embodiment of the present invention will be described.

Figure 4:
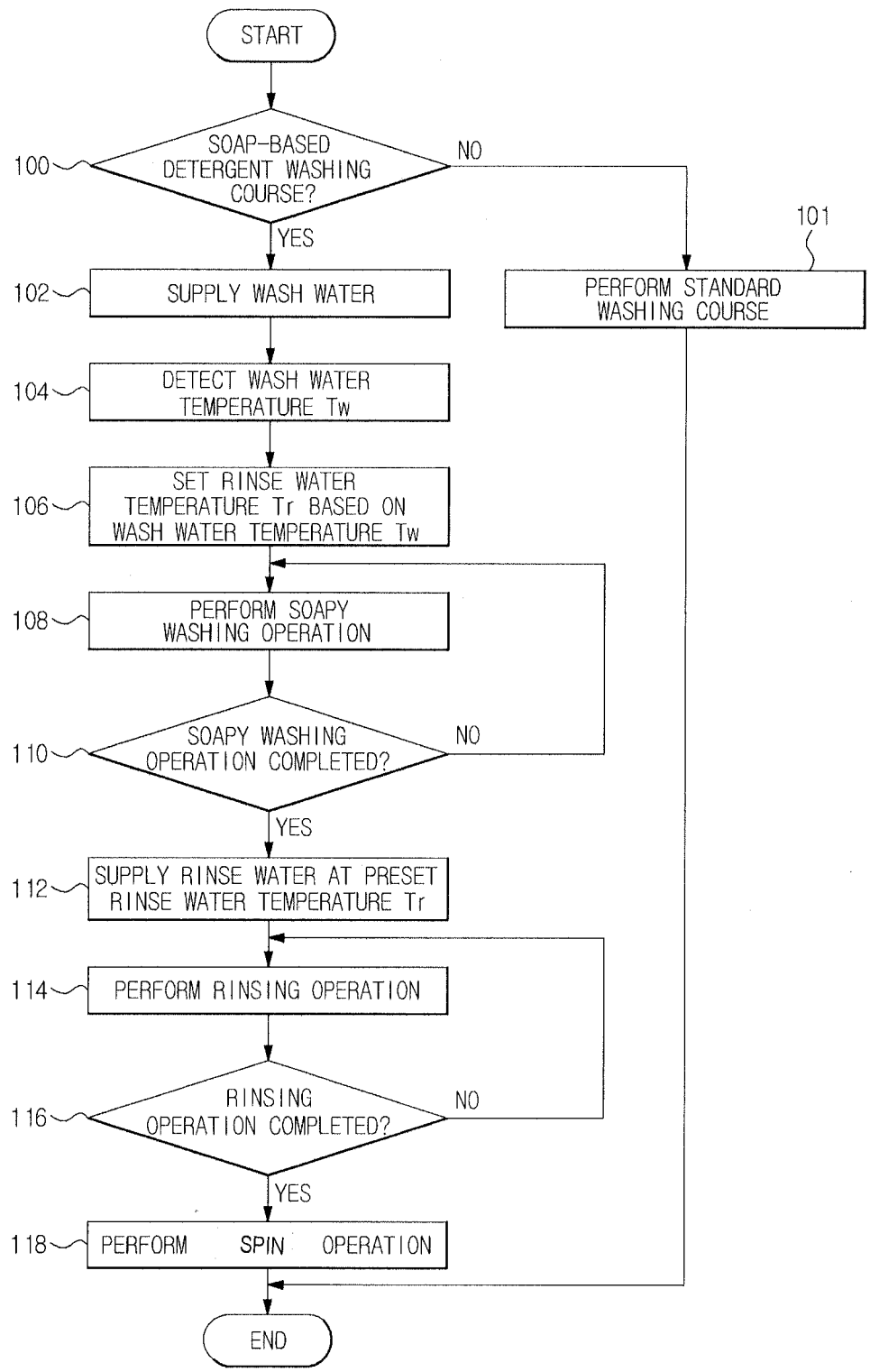
FIG. 4 is a flow chart illustrating a sequence of one exemplary washing algorithm of the washing machine using soap-based detergent according to an embodiment of the present invention.

FIG. 4 is a flow chart illustrating an operation sequence of one exemplary washing algorithm of the washing machine using soap-based detergent according to the embodiment of the present invention. This control algorithm is designed to enhance washing quality despite use of natural soap-based detergent.

In FIG. 4, if the user selects a soap-based detergent washing course after putting laundry into the drum 12 and natural soap-based detergent through the detergent input opening 21, information about the washing course selected by the user is input into the control unit 72 via the input unit 70.

The control unit 72 judges whether or not the washing course selected by the user is the soap-based detergent washing course based on the washing course information input by the input unit 70 (100). If the selected washing course is not the soap-based detergent washing course, a standard washing course is performed in a conventional manner (101).

If it is judged in operation 100 that the washing course selected by the user is the soap-based detergent washing course, the control unit 72 detects load of laundry (i.e. the weight of laundry) put into the drum 12 so as to set target washing and rinsing water-levels, motor RPM and operation rate (motor On-Off time), washing and rinsing times, and the like based on the detected load.

Thereafter, the control unit 72 operates the cold water or hot water valve 33 or 34 to supply water (wash water) required for the washing operation.

If the cold water or hot water valve 33 or 34 is open, the water (wash water) having passed through the external water supply pipe is supplied into the wash tub 11 (more particularly, into a space between the wash tub 11 and the drum 12) along with the soap-based detergent through the cold water or hot water supply pipe 31 or 32, the detergent supply device 20 and the connecting pipe 35 (102).

Thereby, the control unit 72 judges whether or not the wash water supplied into the wash tub 11 reaches a target water-level by detecting the level of wash water using the water-level sensor 16. The control unit 72 continues a water supply operation until the wash water supplied in the wash tub 11 reaches the target water-level.

Simultaneously, the temperature sensor 18 detects the temperature Tw of wash water supplied into the wash tub 11 and sends the detected wash water temperature Tw to the control unit 72 (104).

The control unit 72 sets the rinse water temperature Tr based on the wash water temperature Tw detected by the temperature sensor 18 (106).

Methods of setting the rinse water temperature Tr based on the wash water temperature Tw by the control unit 72 may be differentiated based on whether hot wash water of 50° C. or more is used, tepid wash water of 30~40° C. is used, or cold wash water is used.

The reason to change the rinse water temperature Tr based on the wash water temperature Tw is to restrict a difference ($\Delta T=Tw-Tr$) between the wash water temperature Tw and the rinse water temperature Tr to within a predetermined value (e.g., 30° C.) or less, thereby preventing gelation caused by eco-friendly natural soap-based detergent.

If the wash water is completely supplied to the target water-level, the control unit 72 performs a soapy washing operation. During the soapy washing operation, the motor 15 is operated at a preset target RPM and operation rate (motor On-Off time) to agitate the drum 12 clockwise and counterclockwise, thereby generating streams of detergent-dissolved water (i.e. a mixture of water and the soap-based detergent) to penetrate the laundry (108).

Thereafter, the control unit 72 judges whether or not the soapy washing operation is completed for a preset washing time (110). If the soapy washing operation is not completed, the algorithm is fed back to operation 108 to continue the soapy washing operation.

If it is judged from operation 110 that the soapy washing operation is completed, the control unit 72 supplies water (rinse water) required for a rinsing operation at the preset rinse water temperature Tr (112).

In this case, the control unit 72 controls operation of the heater 17 for supply of hot water and heating of the rinse water so as to supply the rinse water having the preset temperature Tr.

If the rinse water having the preset temperature Tr is supplied up to a target rinsing water-level, the control unit 72 performs a rinsing operation. During the rinsing operation, the motor 15 is operated at preset target RPM and operation rate (motor On-Off time) so as to agitate the drum 12 clockwise and counterclockwise, thereby generating streams of water (rinse water) to penetrate the laundry (114).

Thereafter, the control unit 72 judges whether or not the rinsing operation is completed for a preset rinsing time (or by a preset implementation number of rinsing operations) (116). If the rinsing operation is not completed, the algorithm is fed back to operation 114 so as to continue the rinsing operation.

If it is judged from operation 116 that the rinsing operation is completed, the control unit 72 performs a spin operation (118).

As described above, in the case of the washing algorithm of the washing machine 1 using natural soap-based detergent according to the embodiment of the present invention, the rinse water temperature Tr is changed based on the wash water temperature Tw to prevent gelation caused by the natural soap-based detergent, thereby achieving enhanced washing quality with reduced environmental pollution.

Next, in consideration of the fact that the natural soap-based detergent has difficulty being dissolved, a washing algorithm to add a detergent dissolution stage will be described with reference to FIG. 5.

Figure 5:
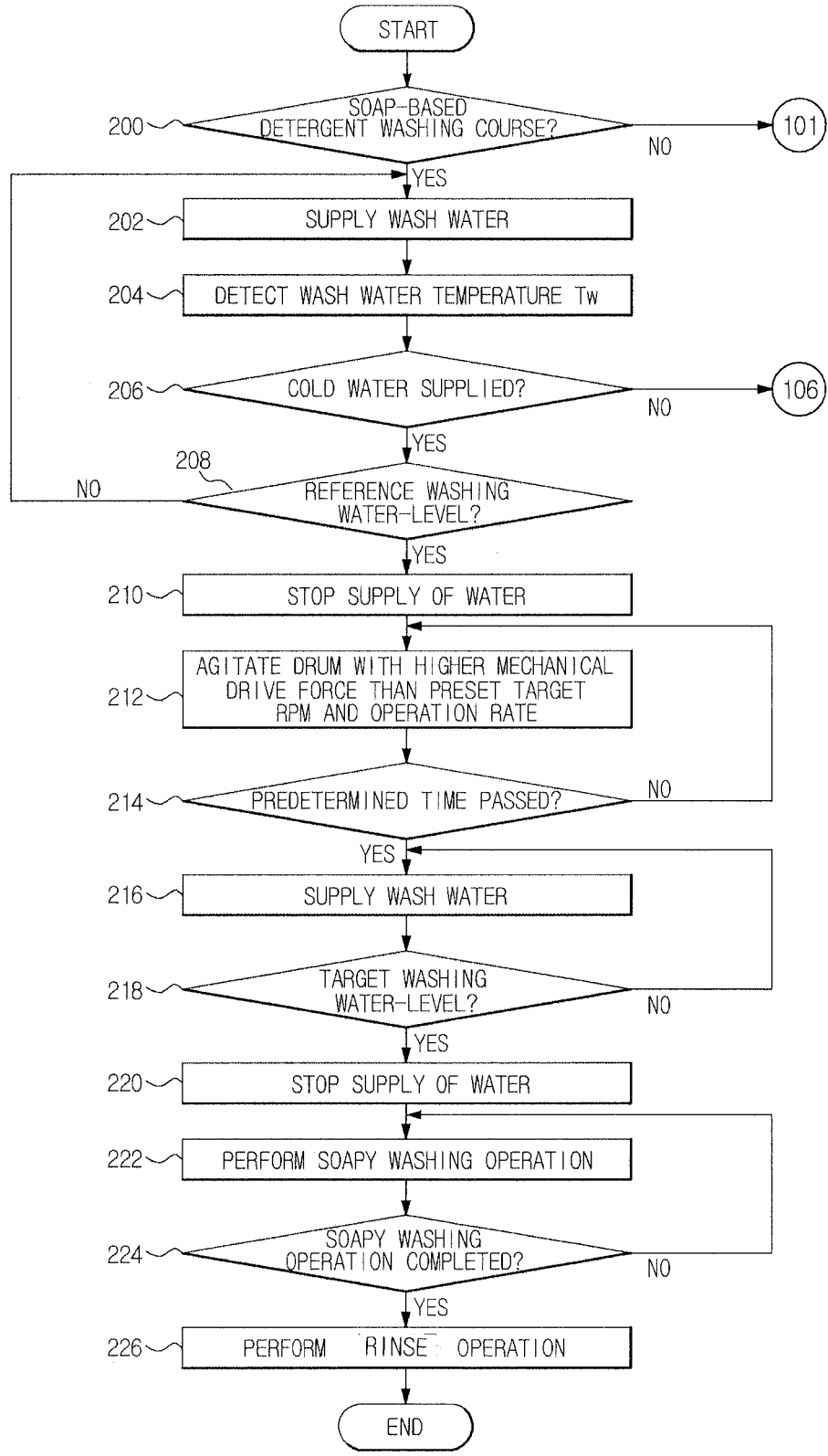
FIG. 5 is a flow chart illustrating a sequence of another exemplary washing algorithm of the washing machine using soap-based detergent according to another embodiment of the present invention.

FIG. 5 is a flow chart illustrating an operation sequence of another exemplary washing algorithm of the washing machine using natural soap-based detergent according to an embodiment of the present invention. The washing algorithm is a control algorithm to add the detergent dissolution stage to dissolve natural soap-based detergent. A description related to the same configuration as FIG. 4 will be substantially omitted.

In FIG. 5, if the user selects a soap-based detergent washing course after putting laundry into the drum 12 and natural soap-based detergent through the detergent input opening 21, the control unit 72 judges whether or not the washing course selected by the user is the soap-based detergent washing course (200).

If it is judged from operation 200 that the washing course selected by the user is not the soap-based detergent washing course, the algorithm is fed back to operation 101 of FIG. 4 such that a standard washing course is performed in a conventional manner.

If it is judged from operation 200 that the washing course selected by the user is the soap-based detergent washing course, the control unit 72 supplies water (wash water) required for a washing operation into the wash tub 11 (202).

In this case, the temperature sensor 18 detects the temperature Tw of wash water supplied into the wash tub 11 and sends the detected temperature Tw to the control unit 72 (204). The control unit 72 judges, based on the temperature Tw of wash water detected by the temperature sensor 18, whether or not the wash water is cold water (206).

If it is judged from operation 206 that the wash water is not cold water, the algorithm is fed back to operation 106 of FIG. 4 so as to perform the previously-described operation.

On the other hand, if it is judged from operation 206 that the wash water is cold water, the control unit 72 judges whether or not the wash water supplied into the wash tub 11 reaches a preset reference washing water-level (i.e. an appropriate level for dissolution of soap-based detergent) using the water level sensor 16. If the wash water does not reach the reference washing water-level, the algorithm is fed back to operation 202 to continue supply of wash water.

If it is judged from operation 208 that the wash water reaches the reference washing water-level, the control unit 72 stops supply of wash water (210).

Thereafter, the control unit 72 operates the motor 15 at the preset target RPM and operation rate (motor On-Off time) for the washing operation so as to increase agitation mechanical drive force of the drum 12. This allows the soap-based detergent to be uniformly and efficiently dissolved in the wash water (212).

The control unit 72 counts a time required to increase the agitation mechanical drive force of the drum 12 via operation of the motor 15 and judges whether or not a predetermined time (i.e., an appropriate time for dissolution of the soap-based detergent) has passed (214). If the predetermined time has not been passed, the algorithm is fed back to operation 212 to perform the following operation.

If it is judged from operation 214 that the predetermined time has passed, the supply of wash water is restarted (216). The control unit 72 judges whether or not the wash water is supplied up to a preset target washing water-level (i.e. a target water-level for a washing operation) by detecting frequency change using the water-level sensor 16 (218).

If it is judged from operation 218 that the wash water does not reach the target washing water-level, the algorithm is fed back to operation 216 to continue the supply of wash water. On the other hand, if the wash water reaches the target washing water-level, the control unit 72 stops the supply of wash water (220).

If the wash water is completely supplied up to the target washing water-level, the control unit 72 performs a soapy washing operation. During the soapy washing operation, the motor 15 is operated at preset target RPM and operation rate (motor On-Off time) so as to agitate the drum 12 clockwise and counterclockwise, thereby generating streams of detergent-dissolved water (i.e. a mixture of water and soap-based detergent) to penetrate the laundry (222).

Thereafter, the control unit 72 judges whether or not the soapy washing operation is completed for a preset washing time (224). If the soapy washing operation is not completed, the algorithm is fed back to operation 222 so as to continue the following operation.

If it is judged from operation 224 that the soapy washing operation is completed, the control unit 72 performs the rinse operation (226). See again FIG. 4, steps 112-118.

As described above, in the case of the washing algorithm of the washing machine 1 using natural soap-based detergent according to this embodiment of the present invention, a detergent dissolution stage is added to assure efficient dissolution of natural soap-based detergent, resulting in enhanced washing quality and reduced environmental pollution.

As is apparent from the above description, according to a washing machine and a control methods thereof, the temperature of rinse water used for a rinsing operation is controlled based on the temperature of wash water used for a washing operation to reduce a difference between the washing operation and the rinsing operation, which may prevent gelation caused when using natural soap-based detergent and maximize washing quality using the natural soap-based detergent.

Although various embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A control method of a washing machine using either a synthetic detergent or a natural soap-based detergent and comprising a rotatable drum in which laundry is received, comprising:
    judging which one of a washing course using the synthetic detergent or a washing course using the natural soap-based detergent is selected;
    if it is determined that the washing course using the natural soap-based detergent is selected, detecting a temperature of wash water in the drum;
    setting a temperature of rinse water to be within a predetermined temperature difference or less from the detected wash water temperature so as to prevent gelation of the natural soap-based detergent;
    performing at least one rinsing operation with the set rinse water temperature;
    detecting a turbidity of the rinse water; and
    comparing the detected rinse water turbidity with a reference turbidity such that a rinsing operation using cold water is performed regardless of the set rinse water temperature if the rinse water turbidity is the reference turbidity or less.

2. The method according to claim 1, wherein setting the rinse water temperature includes setting the rinse water temperature stepwise based on the detected wash water temperature.

3. The method according to claim 2, wherein setting the rinse water temperature stepwise includes setting the rinse water temperature at each step to be lower than the wash water temperature by the predetermined temperature difference or less.

4. The method according to claim 2, wherein setting the rinse water temperature stepwise includes setting the rinse water temperature so as to be gradually lowered based on a number of rinsing operations performed.

5. The method according to claim 4, wherein setting the rinse water temperature so as to be gradually lowered includes setting a difference between the rinse water temperature and a subsequent rinse water temperature to within a predetermined temperature difference or less.

6. The method according to claim 1, wherein the predetermined temperature difference is about 30° C.

7. The method according to claim 1, further comprising:
    judging whether or not wash water is cold water; and
    assisting dissolution of the soap-based detergent by increasing a duration of rotation of the drum, if the wash water is cold water.

8. The method according to claim 7, wherein the drum is rotated by a motor that is operated at a higher revolutions per minute rate than a target revolutions per minute rate that is set for a washing operation, so as to increase a rotation speed of the drum.

9. The method according to claim 1, wherein setting the rinse water temperature includes, if the wash water temperature is 50° C. or more, setting a first rinsing operation to 50° C. and then to 30° C. for remaining rinsing operations.

10. The method according to claim 1, wherein setting the rinse water temperature includes, if the wash water temperature is 30°-40° C., the rinse water temperature being set to 30° C.

11. The method according to claim 10, wherein setting the rinse water temperature includes, after a preset number of rinsing operations, setting the rinse water temperature to cold.

12. A control method of a washing machine comprising a movable drum in which laundry is received, comprising:
   judging whether or not a washing course using soap-based detergent is selected;
   detecting a temperature of wash water, if the washing course using soap-based detergent is selected;
   setting a temperature of rinse water such that a difference between the detected wash water temperature and the rinse water temperature is within a predetermined temperature difference or less, so as to perform at least one rinsing operation;
   detecting a turbidity of the rinse water; and
   comparing the detected rinse water turbidity with a reference turbidity such that a rinsing operation using cold water is performed regardless of the set rinse water temperature if the rinse water turbidity is the reference turbidity or less.

13. A control method of a washing machine comprising a movable drum in which laundry is received, comprising:
   judging whether or not a washing course using soap-based detergent is selected;
   detecting a temperature of wash water, if the washing course using soap-based detergent is selected; and
   setting a temperature of rinse water such that a difference between the detected wash water temperature and the rinse water temperature is within a predetermined temperature difference or less, so as to perform at least one rinsing operation,
   wherein setting the rinse water temperature includes, if the wash water temperature is 50° C. or more, setting a first rinsing operation to 50° C. and then to 30° C. for remaining rinsing operations.

14. A control method of a washing machine comprising a rotatable drum in which laundry is received, comprising:
   judging whether or not a washing course using soap-based detergent is selected;
   detecting a temperature of wash water, if the washing course using soap-based detergent is selected;
   setting a temperature of rinse water to be within a predetermined temperature difference or less from the detected wash water temperature that prevents gelation of the soap-based detergent; and
   performing at least one rinsing operation with the set rinse water temperature;
   detecting a turbidity of the rinse water; and
   comparing the detected rinse water turbidity with a reference turbidity such that a rinsing operation using cold water is performed regardless of the set rinse water temperature if the rinse water turbidity is the reference turbidity or less.

15. A control method of a washing machine comprising a rotatable drum in which laundry is received, comprising:
   judging whether or not a washing course using soap-based detergent is selected;
   detecting a temperature of wash water, if the washing course using soap-based detergent is selected;
   setting a temperature of rinse water to be within a predetermined temperature difference or less from the detected wash water temperature that prevents gelation of the soap-based detergent; and
   performing at least one rinsing operation with the set rinse water temperature,
   wherein setting the rinse water temperature includes, if the wash water temperature is 50° C. or more, setting a first rinsing operation to 50° C. and then to 30° C. for remaining rinsing operations.

\* \* \* \* \*